(12) United States Patent  (10) Patent No.: US 8,099,606 B2
Funahashi et al.  (45) Date of Patent: Jan. 17, 2012

(54) DATA STORAGE APPARATUS, DATA PROVIDING SYSTEM AND DATA PROVIDING METHOD

(75) Inventors: Takeshi Funahashi, Saitama (JP); Sakiko Nagato, Tokyo (JP)

(73) Assignee: Sony Corporation, Tokyo (JP)

( * ) Notice: Subject to any disclaimer, the term of this patent is extended or adjusted under 35 U.S.C. 154(b) by 1399 days.

(21) Appl. No.: 11/168,866

(22) Filed: Jun. 29, 2005

(65) Prior Publication Data

US 2006/0002198 A1  Jan. 5, 2006

(30) Foreign Application Priority Data

Jun. 30, 2004  (JP) ................................ P2004-194648

(51) Int. Cl.
 *G06F 21/00* (2006.01)
(52) U.S. Cl. ............................. 713/189; 726/26; 726/27
(58) Field of Classification Search .................. 713/161, 713/168, 171
See application file for complete search history.

(56) References Cited

U.S. PATENT DOCUMENTS

| | | | | | |
|---|---|---|---|---|---|
| 4,345,315 A | * | 8/1982 | Cadotte et al. | .................. | 705/10 |
| 4,766,295 A | * | 8/1988 | Davis et al. | .................. | 235/383 |
| 5,047,614 A | * | 9/1991 | Bianco | .......................... | 235/385 |
| 7,111,005 B1 | * | 9/2006 | Wessman | .............................. | 1/1 |
| 7,353,387 B2 | * | 4/2008 | Benfield et al. | ............... | 713/165 |

FOREIGN PATENT DOCUMENTS

JP  2001-195407  7/2001

* cited by examiner

*Primary Examiner* — Minh Dinh
(74) *Attorney, Agent, or Firm* — Finnegan, Henderson, Farabow, Garrett & Dunner, L.L.P.

(57) ABSTRACT

The data that a user wants are reliably provided, while avoiding any fraudulent use of the provided data. The present invention provides a data storage apparatus to be connected to an external apparatus by way of a predetermined connection interface, the apparatus comprising a data storage section including a first storage area adapted to be used for freely writing data from the external apparatus connected to the data storage apparatus and limit reading of the written data in the data format used by the external apparatus and a second storage area storing software for executing an operation of reading out the data written in the first storage area, and a control section that controls the operation of the data storage section of reading out the data written in the first storage area by executing the software stored in the second storage area in response to a request from the external apparatus to read out the data written in the first storage area and transmitting the read out data to the external apparatus connected to the data storage apparatus after converting the read out data into a signal of the output format of the external apparatus without fail.

13 Claims, 14 Drawing Sheets

DATA STORAGE APPARATUS, DATA PROVIDING SYSTEM AND DATA PROVIDING METHOD

CROSS REFERENCE TO RELATED APPLICATIONS

The present invention contains subject matter related to Japanese Patent Application JP 2004-194648 filed in the Japanese Patent Office on Jun. 30, 2004, the entire contents of which being incorporated herein by reference.

BACKGROUND OF THE INVENTION

1. Field of the Invention

This invention relates to a method for providing digital data. More particularly, the present invention relates to a data storage apparatus, a data providing system and a data providing method for freely providing desired digital data to the user, while eliminating illegal copying of digital data such as video contents.

2. Description of the Related Art

It is currently possible to easily provide high quality digital contents to the user due to the recent development of rental systems of information storage mediums storing digital data such as CDs (compact discs) and DVDs (digital versatile discs). For example, the user may visit a rental audio/video shop, choose an information storage medium, or a disc, storing the contents he or she wants and take it home from the shop after paying an appropriate amount of money as rental fee that is determined as a function of the lease of the disc. To return the disc to the shop, he or she may visit the shop once again and hand it over to a shop assistant or put it into the collection box of the shop.

However, with such a system, the user has to visit the shop personally. Some users may feel it a trouble to visit the shop personally while others may miss the time limit for returning the disc and become forced to pay the arrearage charge. Thus, many existing disc rental systems are inconvenient and unattractive to the users. Additionally, the music data recorded on a CD can easily be copied by means of a PC (personal computer) at present so that some users may illegally copy the contents of CDs to violate the copyright law and infringe the copyright of the author.

Rental systems for disseminating the contents of books and CDs (normally audio and/or visual works) as electronized perceptual information (perceptual information providing systems) have been proposed to solve the above-identified problems (see, inter alia, Japanese Patent Application Laid-Open Publication No. 2001-195407).

The rental system disclosed in the above patent document comprises a dedicated data station and dedicated portable terminal apparatus and perceptual data of audio and/or visual works stored in the data station are downloaded and output sequentially from a display and/or an earphone to get to a user. The perceptual data downloaded from the data station are controlled for the time limit of availability thereof by the timer mounted in the portable terminal apparatus so that they are automatically erased when the time limit of availability of the perceptual data comes. Thus, such a system is free from the inconveniences of many existing rental systems that require the user to return the rented discs.

SUMMARY OF THE INVENTION

However, the rental system disclosed in the above-cited Patent Document 1 is accompanied by a problem that it indispensably requires a dedicated data station and dedicated portable terminal apparatus so that a long time has to be spent before building the system. The cost of building such a system will be enormous.

The rental system accompanies another problem that each dedicated portable terminal apparatus is designed to output perceptual data by means of a display and a headphone mounted on itself so that it is costly and each user is required to buy such a costly dedicated portable terminal apparatus. The portable terminal apparatus is provided with an external output terminal so that it may be connected to a PC. However, with such an arrangement, a third party can easily and illegally acquire the data downloaded to the portable terminal apparatus.

In view of the above identified problems, it is desirable to provide a data storage apparatus, a data providing system and a data providing method that can be used for providing digital data such as video contents in safe and with which the user can utilize the provided digital data by means of an existing infrastructure.

According to the present invention, there is provided a data storage apparatus to be connected to an external apparatus by way of a predetermined connection interface, the apparatus including:

data storage means including a first storage area adapted to be used for freely writing data from the external apparatus connected to the data storage apparatus and limit reading of the written data in the data format used by the external apparatus and a second storage area storing software for executing an operation of reading out the data written in the first storage area; and control means for controlling the operation of the data storage means of reading out the data written in the first storage area by executing the software stored in the second storage area in response to a request from the external apparatus to read out the data written in the first storage area and transmitting the read out data to the external apparatus connected to the data storage apparatus after converting the read out data into a signal of the output format of the external apparatus without fail.

According to the present invention, there is also provided a data providing system having a terminal apparatus and a data storage apparatus connected to the terminal apparatus by way of a predetermined connection interface, the data storage apparatus including:

data storage means including a first storage area adapted to be used for freely writing data from the terminal apparatus connected to the data storage apparatus and limit reading of the written data in the data format used by the terminal apparatus and a second storage area storing software for executing an operation of reading out the data written in the first storage area;

encryption means for reading out the data written in the first storage area in response to a request from the terminal apparatus to read out the data written in the first storage area and encrypting the data by means of an encryption key annexed to the software; and transmission means for transmitting the encrypted data encrypted by the encryption means and the software annexed by the encryption key to the terminal apparatus, the terminal apparatus including:

control means for having the encryption means execute an encrypting operation by executing the software transmitted from the data storage apparatus, decrypting the encrypted data transmitted from the data storage apparatus by means of the encryption key annexed to the software and converting the decrypted data into a signal of the output format of the terminal apparatus without fail.

According to the present invention, there is also provided a data storage apparatus to be connected to an external apparatus by way of a predetermined connection interface, the apparatus including:

data storage means including a first storage area adapted to be used for freely writing data from the external apparatus connected to the data storage apparatus and limit reading of the written data in the data format used by the external apparatus and a second storage area storing software for executing an operation of reading out the data written in the first storage area;

encryption means for reading out the data written in the first storage area in response to a request from the external apparatus to read out the data written in the first storage area and encrypting the data by means of an encryption key annexed to the software; and transmission means for transmitting the encrypted data encrypted by the encryption means and the software annexed by the encryption key to the terminal apparatus.

According to the present invention, there is also provided a data storage apparatus including:

a first connection interface for establishing a connection with a first external apparatus;

storage means including a first storage area adapted to be used for freely writing data from the first external apparatus connected to the data storage apparatus through the first connection interface and limit reading of the written data in the data format used by the first external apparatus and a second storage area storing software for executing an operation of reading out the data written in the first storage area;

a second connection interface for establishing a connection with a second external apparatus, or an output apparatus; and control means for executing the software stored in the second storage area in response to the connection with the second external apparatus established by way of the second connection interface to read out the data written in the first storage area and transmitting the read out data to the second external apparatus after converting the read out data into a signal of the output format of the second external apparatus without fail.

According to the present invention, there is also provided a data providing method of a data storage apparatus connected to an external apparatus by way of a predetermined connection interface, the method including the steps of:

reading out the data written in the first storage area of the data storage apparatus by executing the software stored in the second storage area of the data storage means of the data storage apparatus in response to a request from the external apparatus connected to the data storage apparatus to read out data; and providing the data by transmitting the data to the external apparatus connected to the data storage apparatus after converting the data into a signal of the output format of the external apparatus without fail.

According to the present invention, there is also provided a data providing method of a data providing system including a terminal apparatus and a data storage apparatus connected to the terminal apparatus by way of a predetermined connection interface, the method including the steps of:

taking out the encryption key annexed to the software for executing an operation of reading out the data stored in the second storage area of the data storage means by the data storage apparatus;

transmitting the software to the terminal apparatus;

transmitting a request to read out the data written in the first storage area of the data storage means to the data storage means by executing the transmitted software by the terminal apparatus;

subsequently reading out the data written in the first storage area in response to the data reading out request and encrypting the read out data by means of the encryption key by the data storage apparatus;

transmitting the encrypted data to the terminal apparatus;

subsequently decrypting the encrypted and transmitted data by means of the encryption key annexed to the software by the terminal apparatus; and converting the decrypted data into a signal of the output format of the terminal apparatus without fail and providing the data.

Thus, according to the present invention, the data written in the first storage area of the data storage means of a data storage apparatus are read out as a result of executing the software stored in the second storage area of the data storage means of the data storage apparatus in response to a request from an external apparatus connected to the data storage apparatus and transmitted to the external apparatus after converting the read out data into a signal of the output format of the external apparatus without fail so as to provide the data as service.

With this arrangement, the data are not output per se but as a signal of the output format of the external apparatus, as pixel data for a monitor for instance. Therefore, if a third party fraudulently acquires the data when they are transmitted to the external apparatus by means of a Trojan horse arranged in the external apparatus, it is not possible for the third party to use the data. Thus, the present invention provides a highly enhanced level of security for the service of providing data.

A data storage apparatus according to the invention is adapted to take out the encryption key annexed to the software stored in the second storage area of the data storage means of the data storage apparatus that needs to be executed to read out the data and transmit the software to a terminal apparatus. Then, the terminal apparatus transmits a request to the data storage means to read out the data written in the first storage area of the data storage means by executing the transmitted software. Subsequently, the data storage apparatus reads out the data written in the first storage area in response to the request for reading out the data, encrypts the data by means of the encryption key and transmits the encrypted data to the terminal apparatus. Finally, the terminal apparatus decrypts the encrypted and transmitted data by means of the encryption key annexed to the software and converts them into a signal of the output format of the terminal apparatus without fail so as to provide the data as service.

With this arrangement, the data storage apparatus outputs only encrypted data. Therefore, if a third party fraudulently acquires the data when they are transmitted to the terminal apparatus, it is not possible for the third party to use the data. Thus, the present invention provides a highly enhanced level of security for the service of providing data.

Additionally, the table of random numbers described in the software that stores the encryption key for encrypting data is updated each time the power supply to the data storage apparatus is activated so that an encryption key is generated anew each time the power supply to the data storage apparatus is activated.

Therefore, if a third party fraudulently acquires the encryption key from the table of random numbers described in the software that is transmitted to the terminal apparatus, it becomes ineffective when the power supply to the data storage apparatus is reactivated. It is therefore possible to prevent any fraudulent use of the data stored in the data storage apparatus.

According to the present invention, the data stored in the first storage area of the data storage means of the data storage apparatus can be viewed repeatedly within a predetermined time limit of availability. However, they are automatically erased when the effective period is gone. Therefore, it is possible to eliminate all the inconveniences of many of the existing rental systems that are being used in many rental shops including the indispensable requirement of returning video tapes, DVDs and CDs.

DETAILED DESCRIPTION OF THE PREFERRED EMBODIMENTS

Figure 1:
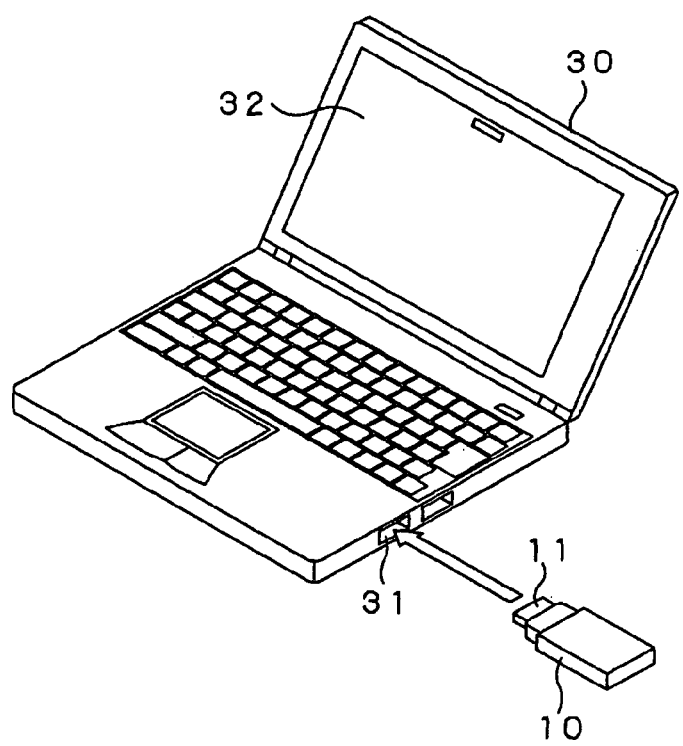
FIG. 1 is a schematic illustration of a mode of utilization of a storage medium to be used as the first embodiment of the present invention.

Now, the present invention will be described in greater detail by referring to the accompanying drawings that illustrate preferred embodiments of the invention. However, it will be appreciated that the present invention is by no means limited to the embodiments that are illustrated in the drawings and described below and various modifications can be made to the embodiments.

First Embodiment

FIG. 1 is a schematic illustration of a mode of utilization of a storage medium 10 to be used as the first embodiment of the present invention.

As shown in FIG. 1, the storage medium 10 becomes operative as the USB (universal serial bus) jack 31, which is a connection interface, of a PC (personal computer) 30 is plugged into the USB plug 11, which is also a connection interface, of the storage medium 10 and power is supplied from the PC 30 to the storage medium 10. The storage medium 10 can be connected for use not only to a PC 30 but also any external apparatus provided with a USB jack that can be connected to a USB plug 11.

The PC 30 to which the storage medium 10 is connected is a general purpose PC adapted to operate under the control of a given OS (operating system). The PC 30 is equipped with a monitor 32 for displaying the outcome of execution of a piece of software by the PC 30 and other information.

Now, the configuration of the storage medium 10 will be described by referring to FIG. 2. The storage medium 10 comprises the above described USB plug 11, a USB controller 12, a ROM (read only memory) 13, a RAM (random access memory) 14, a CPU (central processing unit) 15, a memory controller 16, a flash memory 17, a timer 19 and a battery 20 for the timer.

The USB controller 12, the ROM 13, the RAM 14, the CPU 15, the memory controller 16, the flash memory 17 and the timer 19 are connected to each other by way of a bus 21.

As described above, the USB plug 11 is a USB interface to be connected with a USB interface of an external apparatus such as the USB jack 31 of the PC 30 as illustrated in FIG. 1. The storage medium 10 that is connected to the PC 30 by way of the USB plug 11 is activated to operate for data communication with the PC 30 as power is supplied to it from the PC 30.

The USB controller 12 controls the data transfer operation between the PC 30 and the storage medium 10 through the USB plug 11 according to the USB protocol.

While the storage medium 10 employs a USB interface for connecting itself to the PC 30 in this embodiment, the present invention is by no means limited thereto and any interface may be used for the purpose of the present invention.

The ROM 13 is a memory that stores the firmware that the CPU 15 executes and the file system of the storage medium 10. The ROM 13 stores contents-erasing firmware for completely erasing the digital contents stored in the contents area 17b of the flash memory 17, which will be described in greater detail hereinafter. The RAM 14 is a working memory of the CPU 15.

The CPU 15 executes the firmware or the file system stored in the ROM 13 and controls the operation of the storage medium 10.

The memory controller 16 is controlled by the file system read out from the ROM 13 to the CPU 15 and by turn controls the operation of writing data to the flash memory 17 and that of reading data from the flash memory 17, while managing the data stored in the flash memory 17 as files.

The flash memory 17 is a storage section of the storage medium 10 for storing the data managed as files by the memory controller 16 by means of the file system read out from the ROM 13 to the CPU 15. The storage area of the flash memory 17 includes an open area 17a that immediately becomes accessible from an external apparatus such as PC 30 without limit when the storage medium 10 is connected to the external apparatus such as PC 30 and a contents area 17b that is accessible freely from an external apparatus for the purpose of writing data in it but access to which is limited from an external apparatus for the purpose of reading data from it.

As pointed out above, the contents area 17b of the flash memory 17 is a storage area access to which is limited from an external apparatus such as PC 30 for the purpose of reading data from it. The contents area 17b stores the digital contents (to be referred to simply as contents hereinafter) written by an external apparatus such as PC 30. Contents that can be stored in the contents area 17b are those prepared by any of various pieces of application software and include image data (for still images and moving images), sound data and text data. More specifically, they may include MPEG (Moving Picture Experts Group) data, JPEG (Joint Photographic Coding Experts Group) data, WORD data (WORD: tradename), Excel data (Excel: tradename) and/or Power Point data (Power Point: tradename).

The contents area 17b also stores contents information on the contents stored in it. Contents information is related to the contents and written into the contents area 17b when the latter are written into the contents area 17. Specific examples of contents data include file names and title information for unequivocally identifying the contents stored in the contents area 17, time limit information indicating the time limit of availability of the contents and timer reading information (time information) that indicates the reading of the timer 19. Time limit information and timer reading information are used in the operation of erasing the contents as will be described in greater detail hereinafter.

The time limit information is information that indicates the effective period of the contents during which the contents remain available since they are written in the contents area 17b. For example, if a system with which a user can buy contents by way of the storage medium 10 is built, the time limit of availability, or the effective period, of the contents in the storage medium 10 may be determined in such a way that it is proportional to the amount of the fee the user pays for them.

As pointed out above, the open area 17a of the flash memory 17 is a storage area accessible from an external apparatus such as PC 30 without limit when the storage medium 10 is connected to the external apparatus. The open area 17a stores the application software, which is conversion software (CONTENT_RW.exe), that needs to be used when accessing the above described contents area 17b. The conversion software needs to be used when writing contents into the contents area 17b and when the contents stored in the contents area 17b are opened (reproduced). In other words, the contents area 17b is made accessibly by means of the conversion software stored in the open area 17a.

The timer 19 is energized by the timer battery 20 and constantly shows the current clock time regardless if the storage medium 10 is connected to the PC 30 or not.

[Operation of Writing Contents]

Now, the operation of writing contents in the contents area 17b of flash memory 17 of the storage medium 10 will be described by referring the flow chart of FIG. 3.

In Step S1, the USB jack 31 of the PC 30 is plugged into the USB plug 11 of the storage medium 10 to connect the storage medium 10 to the PC 30. As a result, the storage medium 10 is supplied with power from the PC 30 and brought into a power on state.

In Step S2, the user of the PC 30, accesses the open area 17a of the flash memory 17 of the storage medium 10 from the PC 30 and requests to start executing the conversion software stored in the open area 17a.

Then, in Step S3, the CPU 15 of the storage medium 10 starts executing the conversion software stored in the open area 17a. In the succeeding steps, the CPU 15 operates according to the conversion software that is being executed.

In Step S4, the CPU 15 reads in the contents erasing firmware stored in the ROM 13 and executes a contents erasing process of erasing the contents whose time limit of availability has passed. This contents erasing process in Step S4 will be described in greater detail hereinafter.

In Step S5, the CPU 15 transmits contents information on all the contents stored in the contents area 17b to the PC 30.

Figure 4:
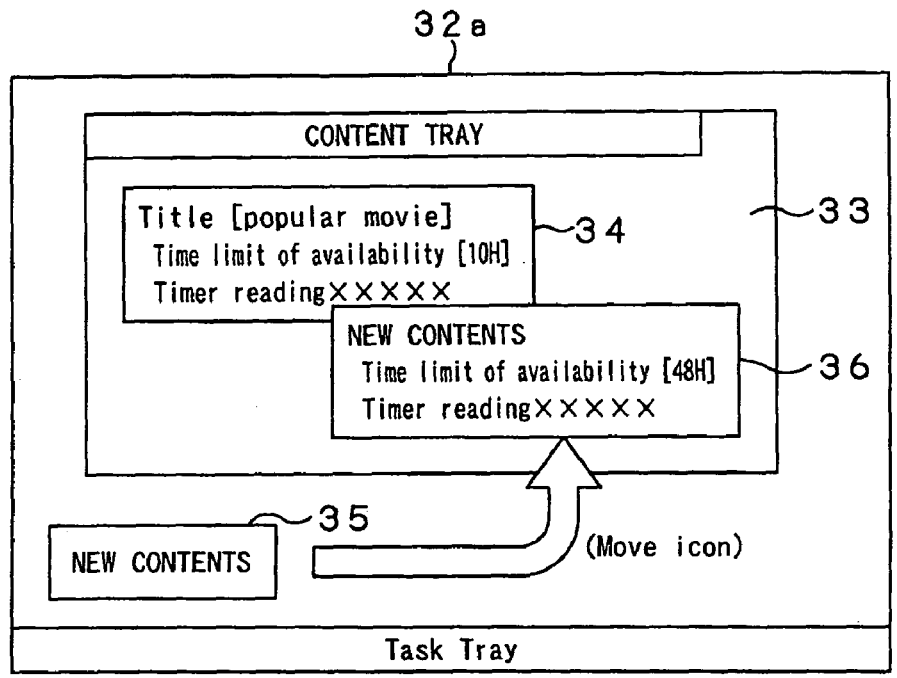
FIG. 4 is a schematic illustration of the image that is displayed on a monitor in a writing operation of the storage medium of FIG. 1.

For example, the contents information transmitted to the PC 30 may be displayed in the window 33 (CONTENTS TRAY) on the display screen 32a of the monitor 32 of the PC 30 as contents information window 34 as shown in FIG. 4.

In Step S6, the user operates to write new contents in the contents area 17b by way of the conversion software that has been started. More specifically, the user moves the new contents that are still in the storage medium of the PC 30 into the window 33 by dragging the icon 35 that is being GUI-displayed by means of an input interface such as mouse in a GUI (graphical user interface) environment that is displayed on the display screen 32a of the monitor 32 as shown in FIG. 4. As a result, the new contents are transmitted from the PC 30 to the storage medium 10:

In Step S7, the CPU 15 of the storage medium 10 writes the transmitted new contents into the contents area 17b. At this time, the CPU 15 writes into the contents area 17b the reading of the timer 19 when the new contents are written into the contents area 17b as timer reading information (time information) that is related to the written contents.

In Step S8, the CPU 15 transmits the contents information on the written contents to the PC 30 in response to the operation of writing new contents into the contents area 17b. For example, the contents information on the new contents transmitted to the PC 30 may be displayed in the window (CONTENT TRAY) 33 on the display screen 32b of the monitor 32 of the PC 30 as contents information window 36 as shown in FIG. 4.

In Step S9, the user returns the process to Step S6 if he or she wants to additionally write other new contents into the contents area 17b. If, on the other hand the user does not want to additionally write any other new contents, he or she ends the process.

[Operation of Erasing Contents]

Figure 5:
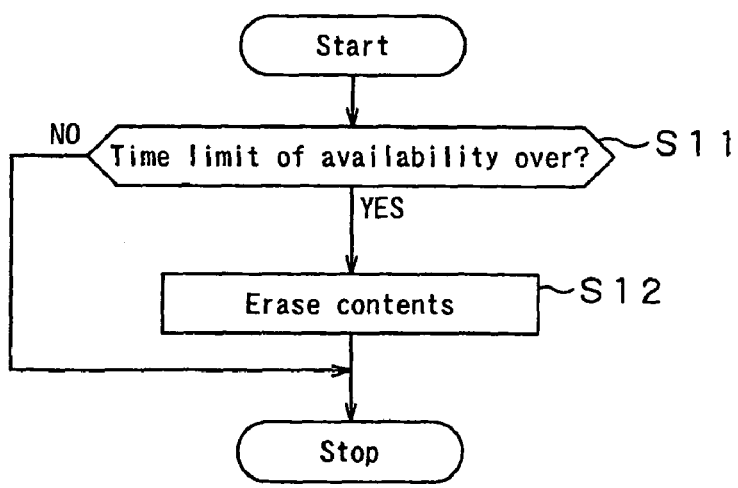
FIG. 5 is a flow chart of the operation of erasing contents from the contents area of the storage medium of FIG. 1.

Now, the operation of erasing contents in Step S4 of FIG. 3 will be described below by referring to the flow chart of FIG. 5.

Firstly, the CPU 15 reads and executes the contents erasing firmware stored in the ROM 13 and also the contents erasing process on the contents stored in the contents area 17b whose time limit of availability has passed.

The CPU 15 reads out the information on the time limit of availability and the timer reading information out of the contents information related to the contents and stored in the contents area 17b based on the contents erasing firmware. Then, it determines the difference between the current reading of the timer 19 and the read out timer reading and compares it with the information on the time limit of availability (Step S11).

At this time, if the difference between the current timer reading and the read out timer reading exceeds the predetermined value in the information on the time limit of availability, the CPU 15 judges that the time limit of availability has passed and completely erases the contents from the contents area 17b (Step S12). The contents erasing firmware does not erase the contents on the directory level. Rather, it completely erases the data on the contents from the flash memory 17.

Figure 3:
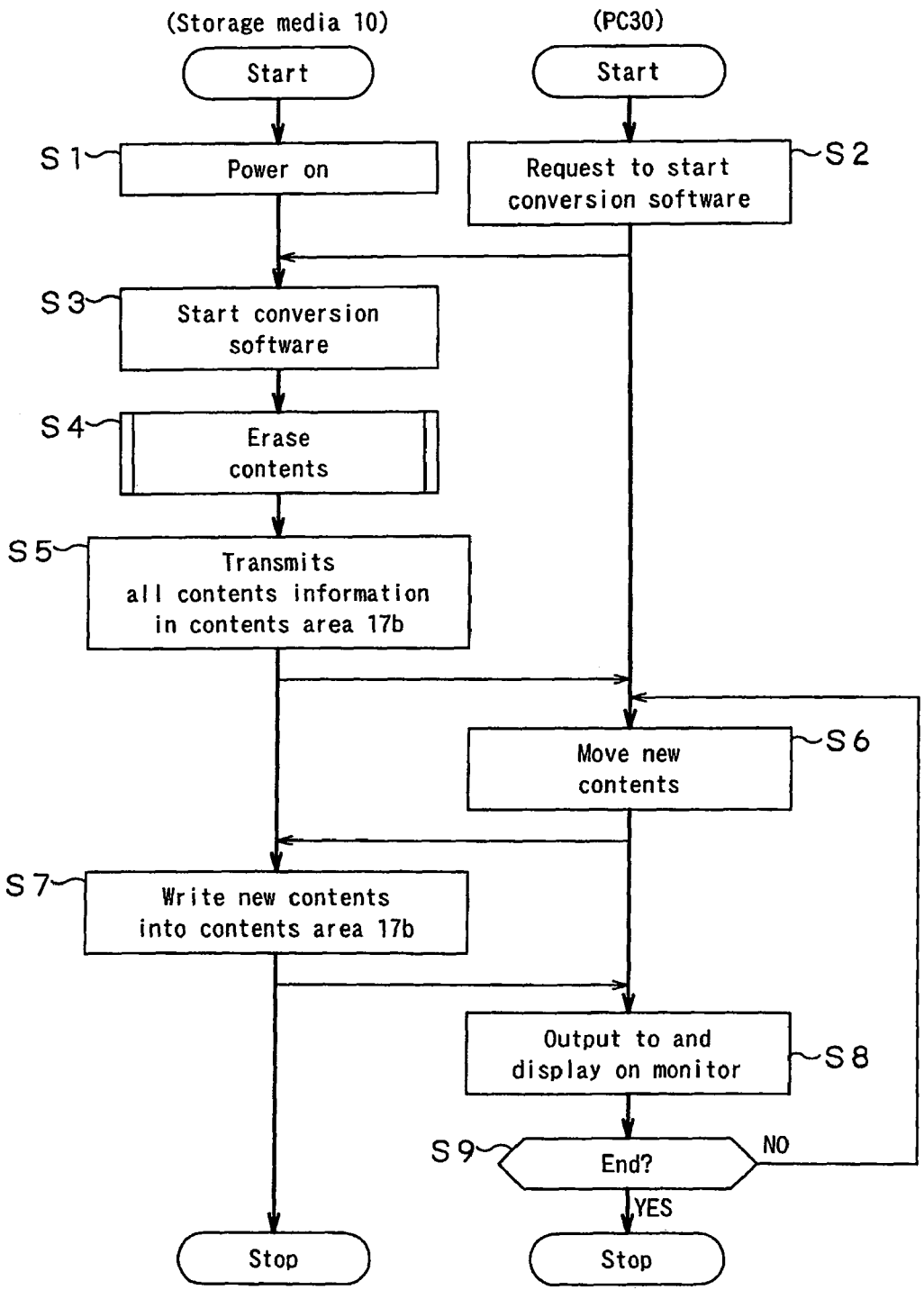
FIG. 3 is a flow chart of the operation of writing contents in the contents area of the storage medium of FIG. 1.

If, on the other hand, the difference between the current timer reading and the read out timer reading is found to be lower than the predetermined value in the information on the time limit of availability, the CPU judges that the time limit of availability does not have passed yet and proceeds to Step S5 in FIG. 3.

The contents erasing process by the contents erasing firmware is executed each time when the conversion software is started. It is executed also when the conversion software is started in order to read contents from the contents area 17b as will be discussed hereinafter.

[Operation of Reading Contents]

Now, the operation of reading the contents stored in the contents area 17b of the flash memory 17 of the storage medium 10 will be described below. Either of the two techniques described below may be used for reading out the contents stored in the contents area 17b.

Figure 6:
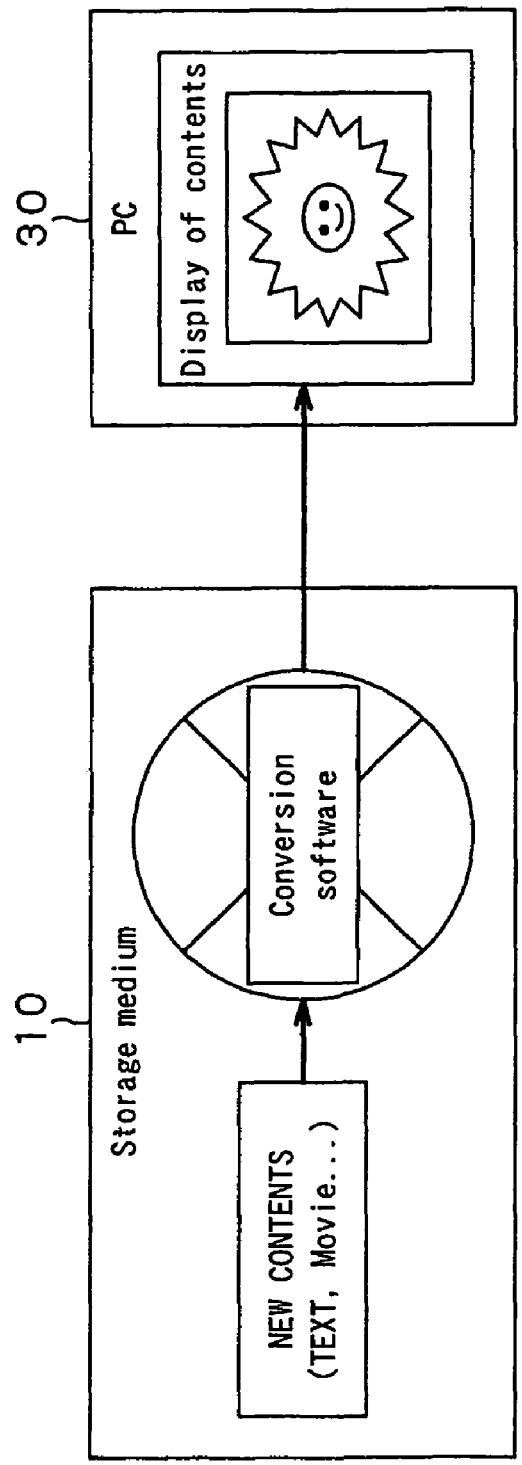
FIG. 6 is a schematic illustration of the first technique of reading out contents from the contents area of the storage medium of FIG. 1.

With the first one of the techniques, the contents stored in the contents area 17b are converted into pixel data that can be handled in the monitor 32 by means of the conversion software stored in the open area 17a and the firmware stored in the ROM 13 of the storage medium 10 as shown in FIG. 6.

Figure 7:
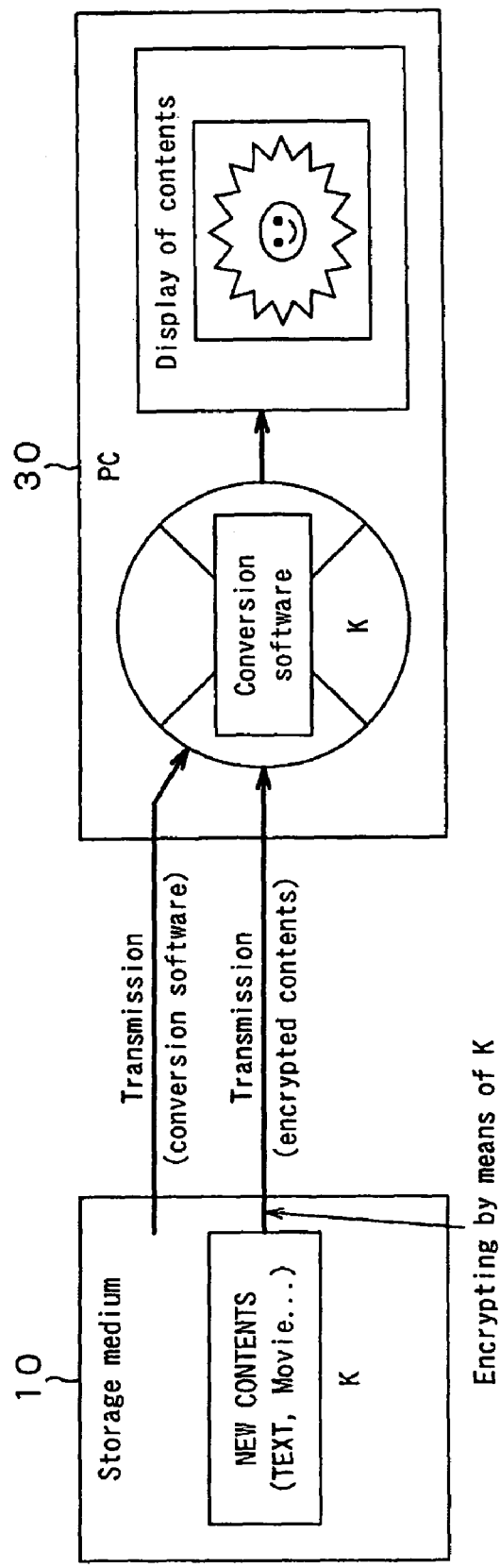
FIG. 7 is a schematic illustration of the second technique of reading out contents from the contents area of the storage medium of FIG. 1.

With the second one of the techniques, the conversion software stored in the open area 17a and the desired contents stored in the contents area 17b are transmitted to the PC 30 and the conversion software converts the contents into pixel data that can be handled in the monitor 32 in the PC 30 as shown in FIG. 7.

<Reading Operation (First Technique)>

Figure 8:
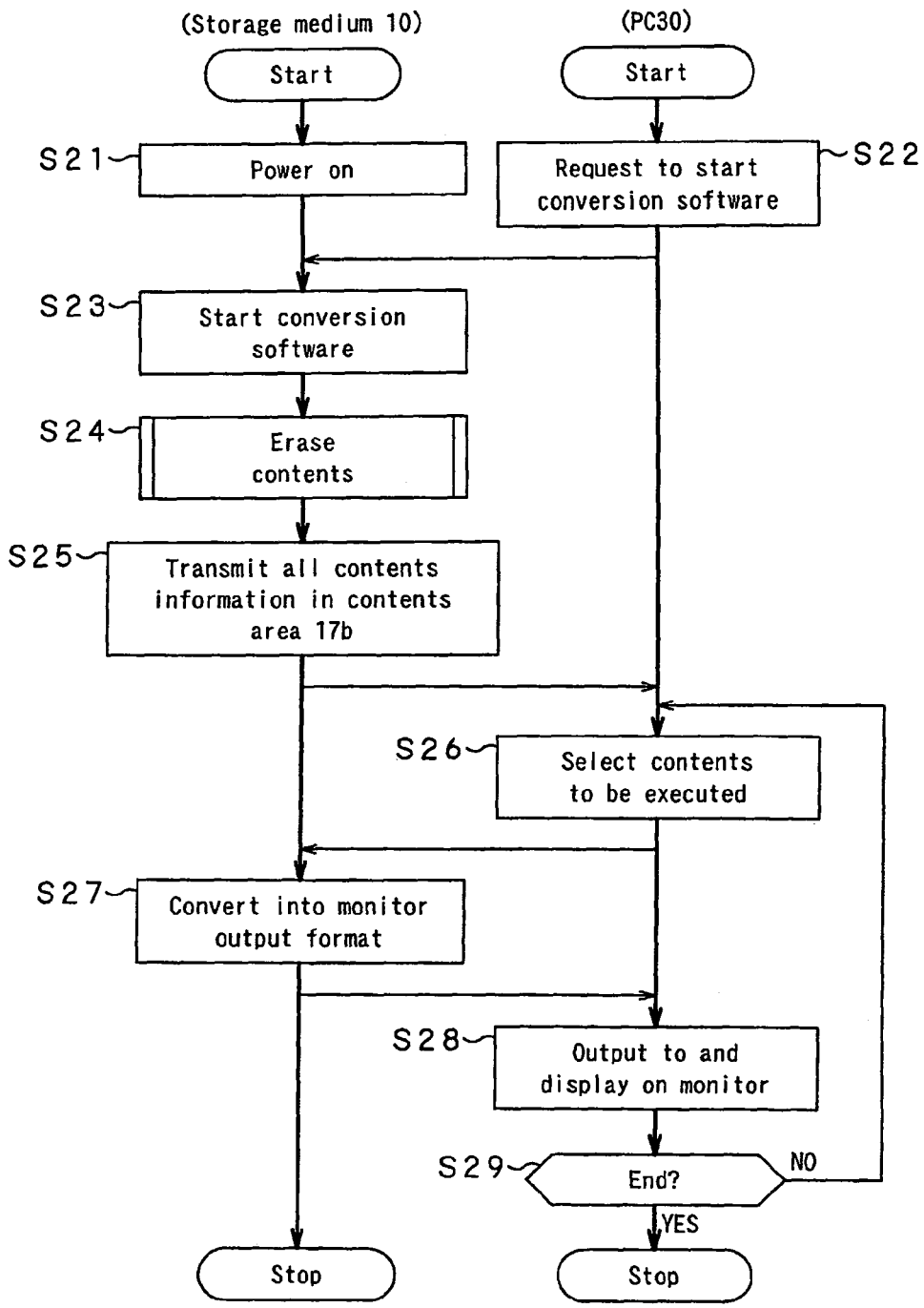
FIG. 8 is a flow chart of the operation of reading out contents from the contents storage area of the storage medium of FIG. 1 by means of the first technique.

Firstly, the operation of reading the contents stored in the contents area 17b by means of the conversion software stored in the open area 17a and the firmware stored in the ROM 13 and converting them in the storage medium 10 into pixel data that can be handled in the monitor 32 will be described by referring to the flow chart of FIG. 8.

In Step S21, the USB jack 31 of the PC 30 is plugged into the USB plug 11 of the storage medium 10 to connect the storage medium 10 to the PC 30. As a result, the storage medium 10 is supplied with power from the PC 30 and brought into a power on state.

In Step S22, the user of the PC 30, accesses the open area 17a of the flash memory 17 of the storage medium 10 from the PC 30 and requests to start executing the conversion software stored in the open area 17a.

Then, in Step S23, the CPU 15 of the storage medium 10 starts executing the conversion software stored in the open area 17a. In the succeeding steps, the CPU 15 operates according to the conversion software that is being executed.

In Step S24, the CPU 15 reads in the contents erasing firmware stored in the ROM 13 and executes a contents erasing process of erasing the contents that is stored in the contents area 17b and whose time limit of availability has passed. Since this contents erasing process in Step S24 is already described by referring to FIG. 5, it will not be described here any further.

In Step S25, the CPU 15 transmits contents information on all the contents stored in the contents area 17b to the PC 30. The contents information transmitted to the PC 30 is displayed on the monitor 32 of the PC 30.

In Step S26, the user selects the contents to be executed from the contents area 17b, that is, the contents to be read out from the contents area 17b, referring to the contents information displayed on the monitor 32. For example, the user may specify the desired contents by doubly clicking the contents information or the icon that is displayed on the monitor 32 to indicate the contents by means of the mouse (not shown) of the PC 30.

In Step S27, the CPU 15 reads out the firmware stored in the ROM 13 according to the conversion software and converts the contents selected from the contents area 17b into pixel data that can be handled in the monitor 32. Then, it transmits the pixel data to the PC 30. If the decoded contents include sound data, the CPU 15 converts them into a sound signal.

In Step S28, the PC 30 converts the transmitted pixel data into an analog signal and supplies it to the monitor 32 so as to have the latter output and display a corresponding image. If the monitor 32 is provided with a DVI (digital visual interface) connector, the PC 30 supplies the pixel data to the monitor 32 without converting them into an analog signal. The sound signal, if any, is amplified by a sound processing unit arranged in the PC 30 and output from a speaker (not shown) also arranged in the PC 30 as sounds.

In Step S29, the user returns the process to Step S26 if he or she wants to additionally read out other new contents from the contents area 17b. If, on the other hand the user does not want to additionally read out any other new contents, he or she ends the process.

In this way, the CPU 15 of the storage medium 10 converts the contents selected by the user by way of the PC 30 in the storage medium 10 into pixel data that can be handled in the monitor 32 by means of the conversion software and the firmware and transmits them to the PC 30. Therefore, the contents data are not output form the USB plug 11 of the storage medium 10 but only the pixel data that have been obtained by means of a conversion process are output from the USB plug 11. Thus, if a third party arranges a Trojan horse in the PC 30 and fraudulently steals the data when the data are transmitted to the PC 30, it cannot use them at all. In other words, the embodiment provides a highly enhanced level of security for the service of providing data.

<Reading Operation (Second Technique)>

Figure 9:
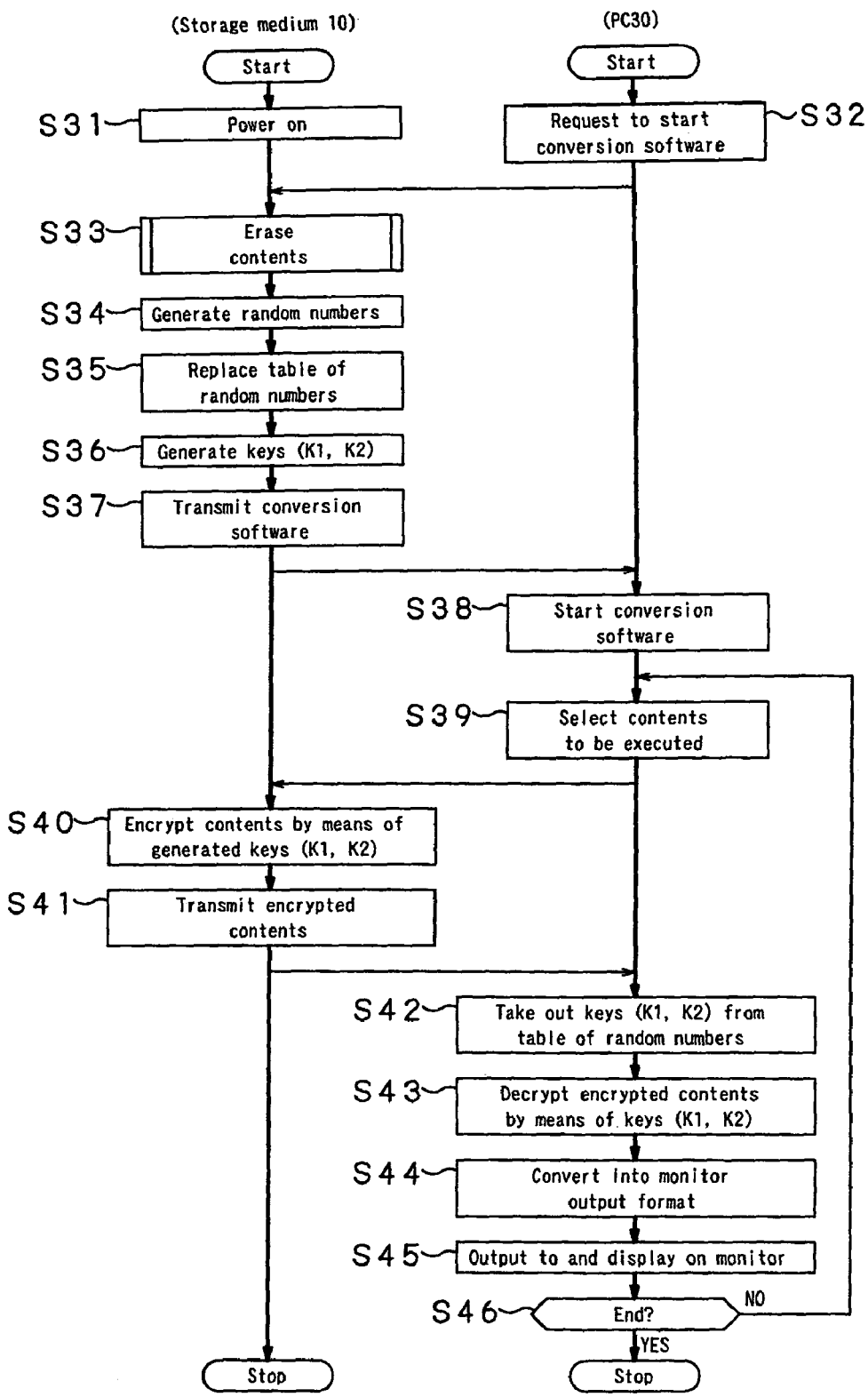
FIG. 9 is a flow chart of the operation of reading out contents from the contents storage area of the storage medium of FIG. 1 by means of the second technique.

The operation for the process of transmitting the contents stored in the contents area 17b and the conversion software stored in the open area 17a to the PC 30 and converting the contents into pixel data that can be handled in the monitor 32 in the PC 30 will be described by referring to the flow chart of FIG. 9.

Figure 10:
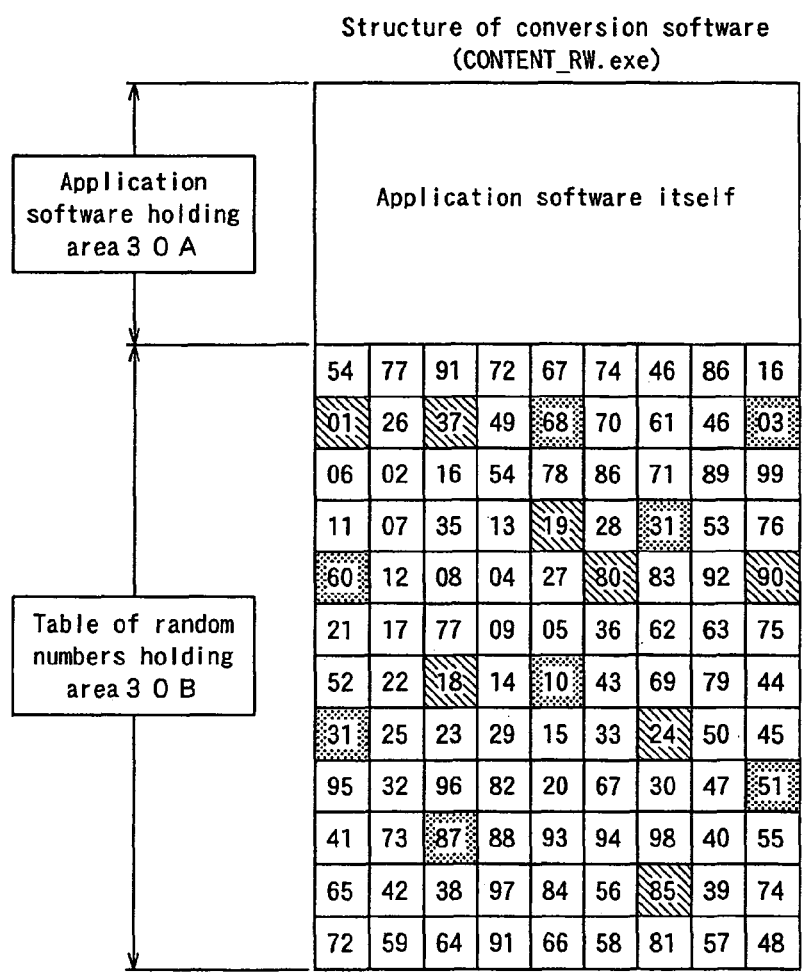
FIG. 10 is a schematic illustration of the configuration of the conversion software in which a table of random numbers is described.

When this technique of reading is used, the conversion software stored in the open area 17a has a configuration as shown in FIG. 10. Referring to FIG. 10, the conversion software includes an application software holding area 30A where the application software itself is described and a table of random numbers holding area 30B where a table of random numbers is described. The table of random numbers described in the table of random numbers holding area 30B is adapted to be used in an encryption process when the conversion software stored in the open area 17a and the contents stored in the contents area 17b are transmitted to the PC 30.

Figure 11:
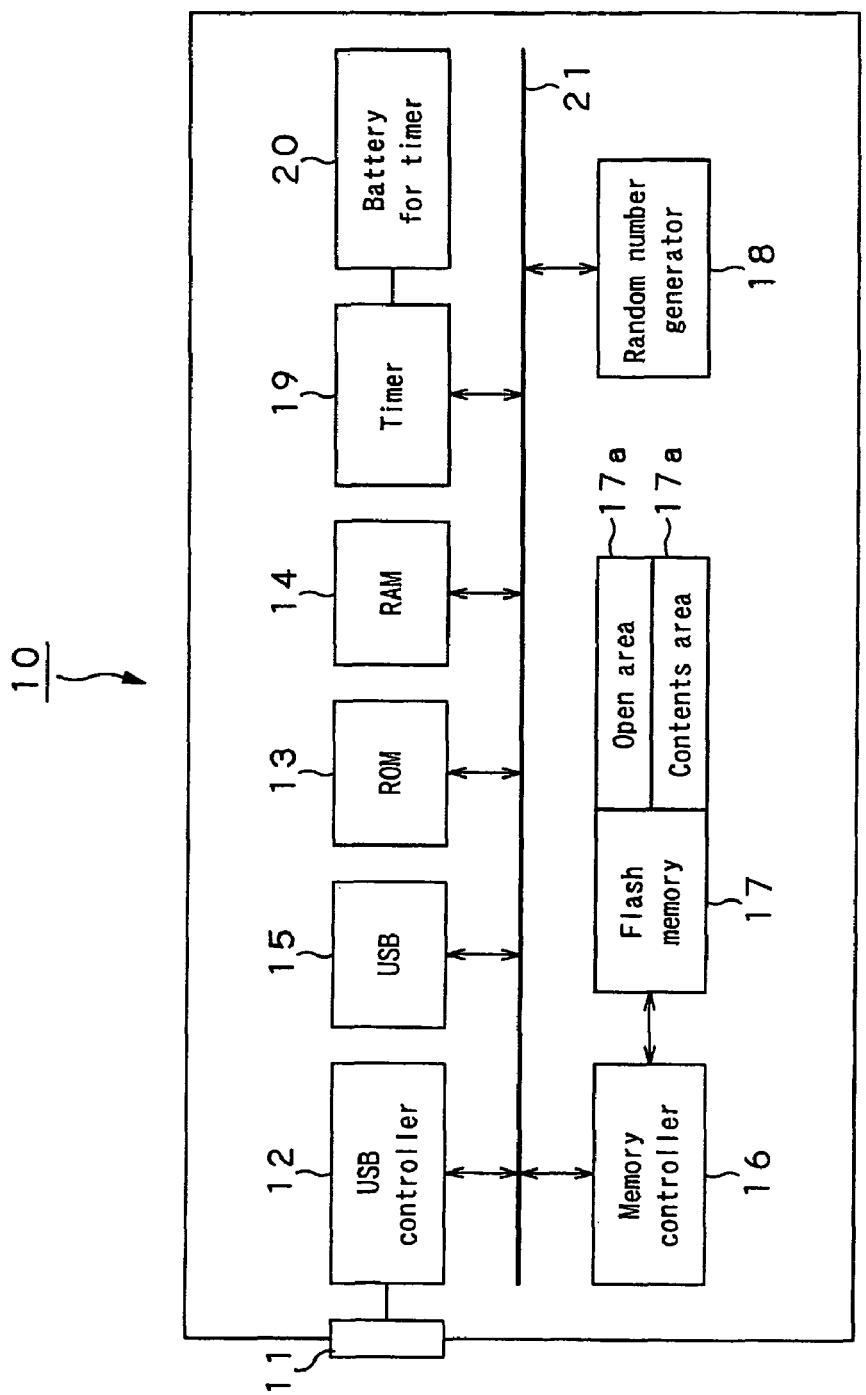
FIG. 11 is a schematic block diagram of the storage medium of FIG. 1 to which a random number generator is added.

As a matter of course, the storage medium 10 additionally comprises a random number generator 18 as shown in FIG. 11. As will be described in greater detail hereinafter, the random number generator 18 generates random numbers to be used for rewriting the table of random numbers described in the table of random numbers holding area 30B each time the power supply to the storage medium 10 is activated.

In Step S31, the USB jack 31 of the PC 30 is plugged into the USB plug 11 of the storage medium 10 to connect the storage medium 10 to the PC 30. As a result, the storage medium 10 is supplied with power from the PC 30 and brought into a power on state.

In Step S32, the user of the PC 30 accesses the open area 17a of the flash memory 17 of the storage medium 10 from the PC 30 and requests to start executing the conversion software stored in the open area 17a.

Then, in Step S33, the CPU 15 reads in the contents erasing firmware stored in the ROM 13 and executes the process of erasing the contents whose time limit of availability has passed out of the contents stored in the contents area 17b. Since the process of erasing the contents is already described above by referring to FIG. 5, it will not be described here any further.

In Step S34, the CPU 15 reads in and executes the predetermined firmware from the ROM 14 in response to the request for starting an execution of the conversion software and has the random number generator 18 generate random numbers under its control.

In Step S35, the CPU 15 rewrites the table of random numbers described in the table of random numbers holding area 30B of the conversion software that is stored in the open area 17a, using the random numbers generated by the random number generator 18.

In Step S36, the CPU 15 generates an encryption key for encrypting the contents to be transmitted to the PC 30 from the rewritten table of random numbers according to the executed firmware. As an example, it is assumed here that the 3DES (Triple Data Encryption Standard) that uses two different keys is adopted as encryption algorithm for encrypting the contents and two keys K1 and K2 are generated from the table of random numbers. The two keys K1 and K2 are formed by extracting and arranging the numerals arranged at the predetermined positions in the table of random numbers.

For example, the CPU 15 uses the table of random numbers described in the table of random numbers holding area 30B as shown in FIG. 10 and generates K1 by arranging the numerals located at the dot-shaded positions in the table and K2 by arranging the numbers located at the oblique-line-shaped positions in the table as listed below.
K1=68 03 31 60 10 31 51 87
K2=01 37 19 80 90 18 24 85

The generated keys, K1 and K2, are temporarily written into the RAM 14.

In Step S37, the CPU 15 transmits the conversion software, of which the table of random numbers has been rewritten according to the firmware, to the PC 30.

In Step S38, the PC 30 starts executing the conversion software transmitted from the storage medium 10. In the succeeding steps, the CPU 15 operates according to the conversion software that is being executed.

In Step S39, the PC 30 receives contents information on all the contents stored in the contents area 17b of the storage medium 10 by way of the conversion software and displays it on the monitor 32.

Then, the user selects the contents to be executed from the contents area 17b that is the contents to be read out from the contents area 17b, referring to the contents information displayed on the monitor 32. For example, the user may specify the desired contents by doubly clicking the contents information or the icon that is displayed on the monitor 32 to indicate the contents by means of the mouse (not shown) of the PC 30.

In Step S40, the CPU 15 of the storage medium 10 encrypts the contents selected by way of the PC 30 according to the firmware by means of the encryption keys generated in Step S36. If the 3DES is adopted as encryption algorithm as described above, the CPU 15 firstly encrypts the selected contents by every 8 Bytes (64 bits) by means of K1. Subsequently, the CPU 15 decodes the contents, which have been encrypted by every 8 Bytes by means of K1, by means of K2.

Thereafter, the CPU 15 encrypts the contents, which have been decrypted by every 8 Bytes by means of K2, by means of K1.

In Step S41, the CPU 15 transmits the encrypted contents to the PC 30 according to the firmware.

In Step S42, the PC 30 takes out the keys that have been generated from the table of random numbers described in the transmitted conversion software and used for encrypting the contents. The technique that is used for taking out the keys is exactly same as the technique used for generating the keys. In other words, the keys K1 and K2 can be taken out by arranging the numerals arranged at the predetermined positions in the table of random numbers.

In Step S43, the PC 30 decrypts the encrypted contents by means of the taken out keys according to the conversion software. As pointed out above, it is possible to decrypt the encrypted contents that are encrypted by means of the 3DEC, using the keys K1 and K2 and following the procedure that is exactly reverse to the above described encryption procedure. Note that the decrypted contents are not stored in the HD (hard disc) of the PC 30 but immediately used for the next step, or Step S44.

In Step S44, the PC 30 converts the decrypted contents into pixel data that can be handled in the monitor 32 according to the conversion software. If the decoded contents include sound data, the CPU 15 converts them into a sound signal.

In Step S45, the PC 30 converts the transmitted pixel data into an analog signal and supplies it to the monitor 32 so as to have the latter output and display a corresponding image. If the monitor 32 is provided with a DVI (digital visual interface) connector, the PC 30 supplies the pixel data to the monitor 32 without converting them into an analog signal. The sound signal, if any, is amplified by a sound processing unit arranged in the PC 30 and output from a speaker (not shown) also arranged in the PC 30 as sounds.

In Step S46, the user returns the process to Step S39 if he or she wants to read out other new contents from the contents area 17b. If, on the other hand, the user does not want to additionally read out any other new contents, he or she ends the process.

In this way, the storage medium 10 transmits the conversion software to the PC 30 and, at the same time, it also encrypts the contents selected by the user by way of the PC 30 by means of the encryption keys K1 and K2 generated from the table of random numbers of the conversion software and transmits them to the PC 30. The PC 30 then takes out the encryption keys K1 and K2 that are transmitted together out of the transmitted conversion software and decrypts the encrypted contents. Then, it converts the decrypted contents into pixel data that can handled in the monitor 32.

Therefore, only the encrypted contents are output from the USB plug 11 of the storage medium 10. Thus, if a third party fraudulently steals the data when the data are transmitted to the PC 30, it cannot use them at all. In other words, the embodiment provides a highly enhanced level of security for the service of providing data.

Additionally, the table of random numbers described in the conversion software that stores the keys K1 and K2 for encrypting the contents is updated each time the power supply to the storage medium 10 is activated so that encryption keys K1 and K2 are generated anew each time the power supply to the storage medium 10 is activated. Therefore, if a third party fraudulently steals the keys K1 and K2 from the table of random numbers described in the conversion software transmitted to the PC 30, they are no longer effective when the power supply to the storage medium 10 is reactivated so that the contents are prevented from being fraudulently used.

Thus, when the storage medium 10 of the first embodiment is used in a rental shop or a convenience store that sells contents such as movies and a user buys desired contents, the desired contents are written into the contents area 17b as described above by referring to FIG. 3. Then, the user who bought the contents connects the storage medium 10 to the general purpose PC 30 he or she owns and has the storage medium 10 execute the reading process as described above by referring to FIGS. 8 and 9.

It will be appreciated that the contents read out from the contents area 17b are provided to the user simply as images that are displayed on the monitor 32 and sounds that are output from the speaker (not shown) and the user cannot own the contents as digital data. Therefore, the user can never take a fraudulent action of infringing the copyright of the contents and the risk that a third party other than the user fraudulently acquires the contents is also completely eliminated.

While the storage medium 10 allows the contents that are stored in the contents area 17b and decrypted to be viewed repeatedly before the time limit of availability comes. However, once the time limit of availability has passed, the CPU 15 automatically erases the contents. Thus, the storage medium 10 does not require any inconvenience to a user of returning the video tape or the DVD that the user rented from a rental shop.

Second Embodiment

Figure 12:
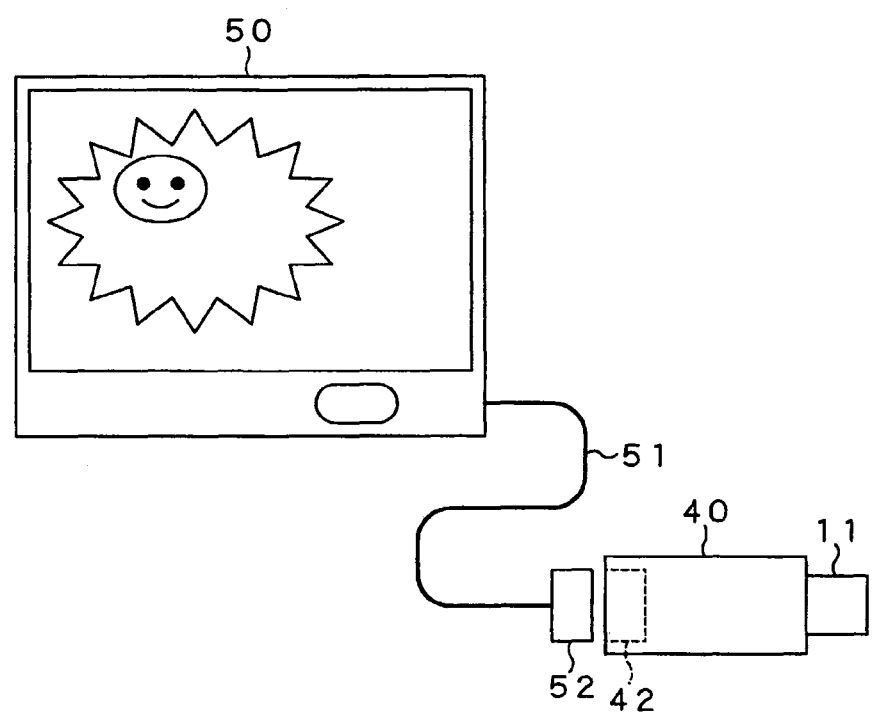
FIG. 12 is a schematic illustration of a mode of utilization of a storage medium to be used as the second embodiment of the present invention.

While the storage medium 10 of the first embodiment commonly employs a same interface for both writing and reading contents, the storage medium 40 of the second embodiment comprises a video output interface 42 for reading the stored contents and outputting them to an external apparatus in addition to the USB jack 11 for writing contents from the external apparatus as shown in FIG. 12. The video output interface 42 is adapted to output an analog signal obtained by converting pixel data and supplied to monitor 50 by way of cable 51. The connection interface 52 of the cable 51 is connected to the video output interface 42 of the storage medium 40.

Figure 13:
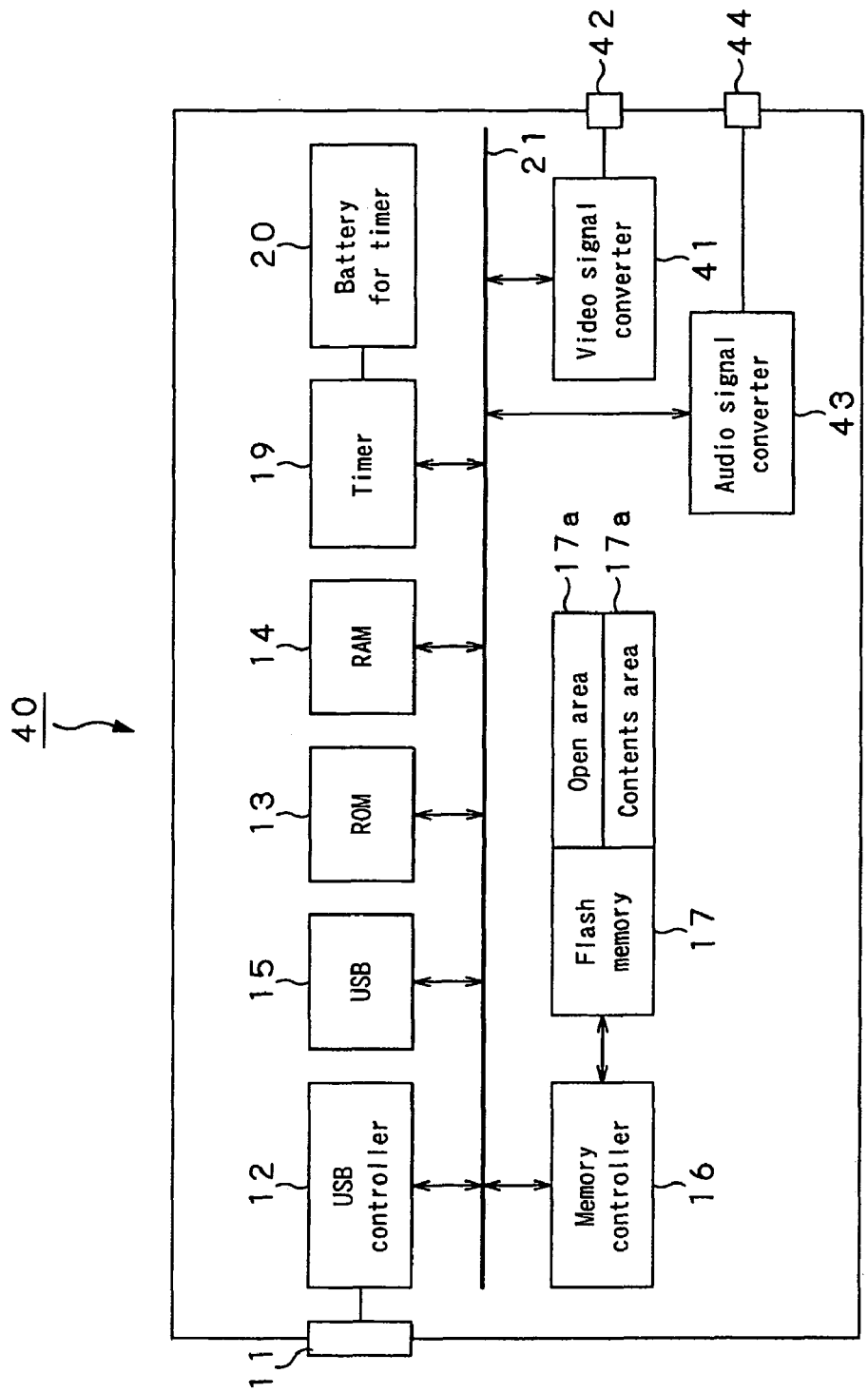
FIG. 13 is a schematic block diagram of the storage medium of FIG. 12.

The storage medium 40 typically has a configuration as illustrated in FIG. 13. In FIG. 13, the components of the storage medium 40 that are same as those of the storage medium 10 of the first embodiment are denoted respectively by the same reference symbols and the description thereof will be omitted.

Figure 2:
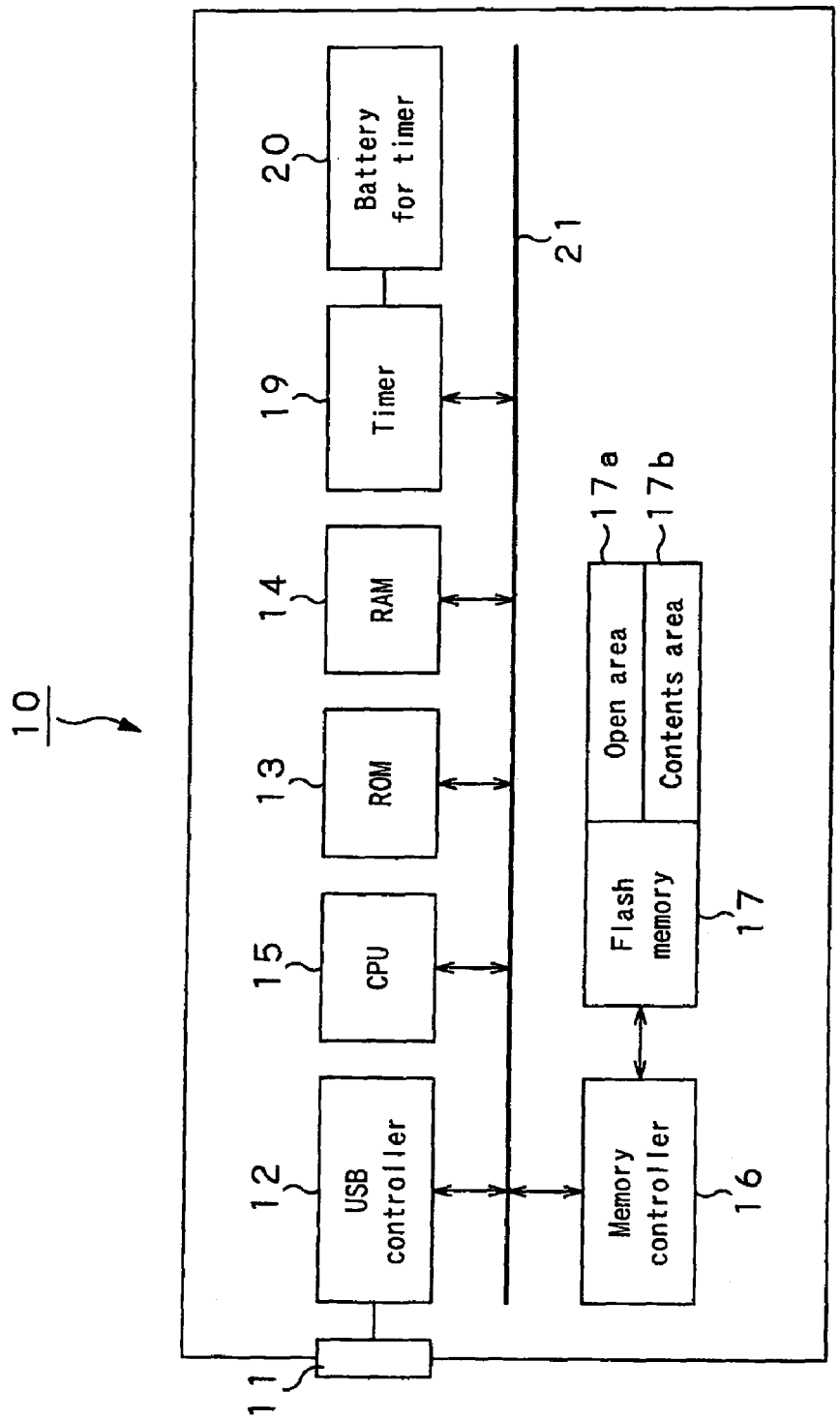
FIG. 2 is a schematic block diagram of the storage medium of FIG. 1.

As shown in FIG. 13, the storage medium 40 comprises a video signal converter 41 and a video output interface 42 in addition to the components of the storage medium 10 illustrated in FIG. 2. The video signal converter 41 converts the contents read out from the contents area 17b into pixel data and then into an analog signal, which is then supplied to the video output interface 42.

Thus, like the storage medium 10 of FIG. 2, the storage medium 40 is adapted to freely write contents into its contents area 17b from an external apparatus such as PC 30 by means of the conversion software stored in its open area 17a and, at the same time, convert the contents in the contents area 17b into an analog signal that can be handled in the monitor 50 of the storage medium 40 by means of a video signal converter 41.

Therefore, it is not possible to read out contents from the storage medium 40 as digital data and hence the risk that the contents in the storage medium 40 are fraudulently used is completely eliminated.

The storage medium 40 may additionally comprise an audio signal converter 43 for handling contents such as those of movies that include sound data and an audio output interface 44. Then, the audio signal converter 43 converts the digital sound data included in the contents and supplies them to the audio output interface 44. If the PC 30 does not have any audio output feature, the storage medium 40 will be connected to an audio amplifier or an audio output apparatus having an amplifying feature by way of the audio output interface 44 and an audio cable.

If the storage medium 40 is adapted to handle sound data, it is not possible to read out sound data included in contents as digital data and hence the risk that the contents in the storage medium 40 are fraudulently used is completely eliminated.

Figure 14:
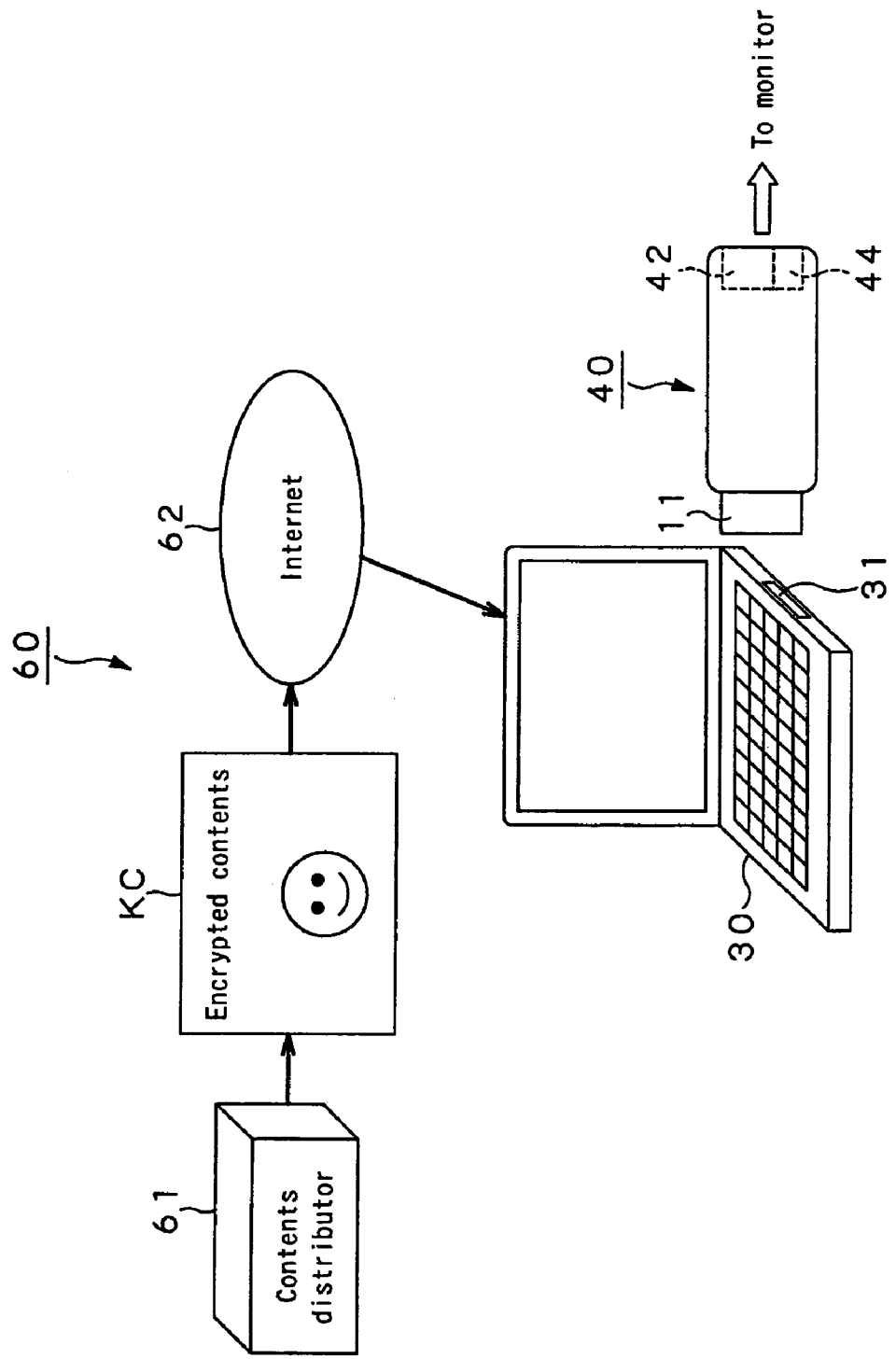
FIG. 14 is a schematic illustration of a contents distribution system using the storage medium of FIG. 12.
Figure 15:
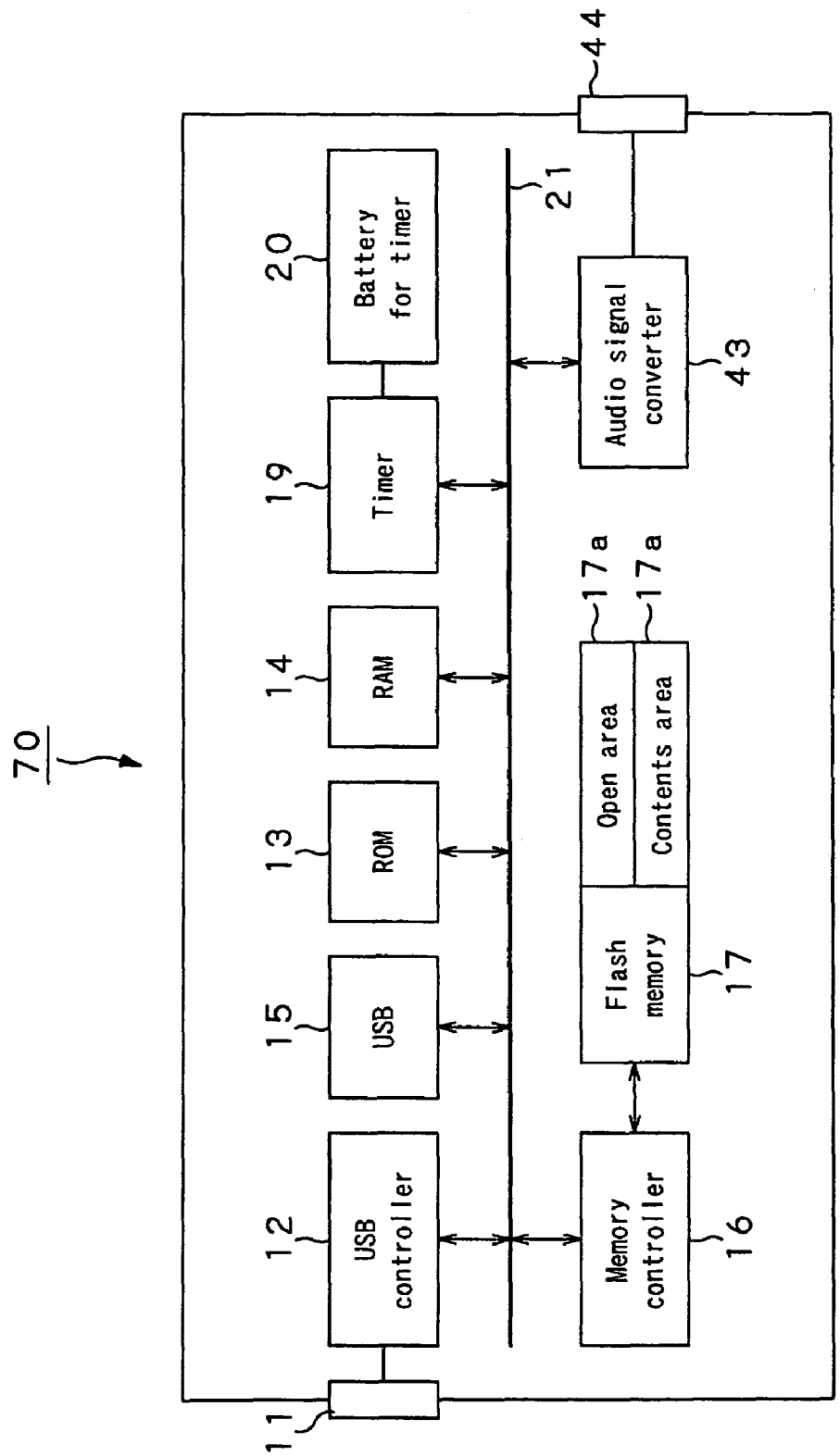
FIG. 15 is a schematic block diagram of a storage medium to be used as the third embodiment of the present invention.

It is possible to build a contents distribution system 40 connected to a network 62 such as the Internet as shown in FIG. 14 by using the storage medium 40 of the second embodiment.

Referring to FIG. 14, contents distributor 61 operates for distributing contents such as movies. The contents distributor 61 firstly sells storage mediums 40 to users, directly or by way of sales agents. Each storage medium 40 sold to a user carries a serial number for unequivocally identifying the storage medium 40 and stored in the contents area 17b of the flash memory 17 or in the ROM 13. The storage medium 40 also stores an encryption key K also in the contents area 17b or in the ROM 13.

Now, the operation that needs to be performed by the user who has bought a storage medium 40 when buying contents from the contents distributor 61 will be described below. The user connects the storage medium 40 he or she has purchased to an external apparatus such as PC 30 and starts operating the conversion software stored in the open area 17a in order to access the contents distributor 61 by way of the network 62.

The user can access the server of the contents distributor 61 by inputting the user information that has been registered in advance. When the contents distributor 61 verifies that the accessing user is a valid user, the contents distributor 61 provides a list of contents that can be distributed.

Then, the user specifies the contents he or she wants, referring to the list of contents, and sends a request for distribution of the contents to the contents distributor 61. At this time, the user pays the charge for viewing the contents on line typically by means of a credit card. The charge may be calculated on the basis of the period from the time of receiving the contents and the time limit of availability of the contents.

Then, the contents distributor 61 encrypts the specified contents by means of the encryption key K stored in the storage medium 40 that is owned by the user and the serial number of the storage medium 40 and transmits the encrypted contents KC to the PC 30 by way of the network 62. The encrypted contents KC that are transmitted to the PC 30 are then decrypted by means of the encryption key K and the serial number of the storage medium 40 and written into the contents area 17b.

Once the purchased contents are written into the contents area 17b, the user can read out the contents and output them by way of the video signal converter 41, the video output interface 42, the audio signal converter 43 and the audio output interface 44.

While the user can view the decrypted contents that are stored in the contents area 17b of the storage medium 40 at any time until the time limit of availability comes. However, when the time limit of availability has passed, they are automatically erased by the CPU 15. Thus, the storage medium 40 does not require any inconvenience to a user of returning the videotape or the DVD that the user rented from a rental shop.

The contents distribution system 60 of FIG. 14 may be so modified that a PC 30 connected to the contents distributor 61 via the network is placed in a convenience store to allow a user visiting the convenience store to purchase the contents. The client then does not have to return the contents he or she purchased.

Third Embodiment

The storage medium 70 of the third embodiment differs from the storage medium 40 of the second embodiment in that it does not comprise a video signal converter 41 and a video output interface 42 unlike the storage medium 40. On the other hand, the storage medium 70 comprises an audio signal converter 43 and an audio output interface 44 like the above described storage medium 40. Thus, the storage medium 70 is adapted to be connected to a portable music reproduction apparatus, for example, by way of the audio output interface 44 so as to reproduce music contents.

Thus, the storage medium 70 is adapted to freely write audio contents into its contents area 17b from an external apparatus such as PC 30 by means of the conversion software stored in its open area 17a and, at the same time, convert the audio contents in the contents area 17b into an analog signal in the storage medium 70 by means of the audio signal converter 43.

Therefore, it is not possible to read out audio contents from the storage medium 70 as digital data and hence the risk that the audio contents in the storage medium 70 are fraudulently used is completely eliminated.

The storage medium 70 can be used for a contents distribution system 60 as shown in FIG. 14. If compared with video contents, audio contents may be used frequently for a long period of time. Therefore, the demand of the user may not be met if the audio contents stored in the contents area 17b are simply erased when the time limit of availability comes. In other words, it may be a good idea to offer audio contents to the user for a charge that is less expensive to the user than the rental fee of a CD for the purpose of sales promotion of the CD. It may be so arranged that the user can acquire audio contents by way of a network 62 personally or at a convenience store. In any case, the user can utilize audio contents with a time limit so that he or she may purchase a CD of the audio contents after the time limit.

A CD seller may cooperate with a contents distributor in such a way that users who have bought audio contents that are offered for sales promotion can buy a CD of the audio contents at a discount price or with a limited free service item that makes the user feel advantageous and stimulates the buying desire on the part of the user.

Thus, the above described feature of automatically erasing the contents stored in the contents area 17b of each of the storage mediums 10, 40 and 70 may be exploited not only for the purpose of distribution of contents but also for the purpose of sales promotion of application software. Particularly, in the case of expensive application software, the user may want to try it before he or she purchases it. Then, the above-described time limit of availability may be used as "trial period" for sales promotion so that the user may use the application software stored in the contents area 17b until the time limit of availability comes.

In the case of purchasing map data to be used in car navigation systems as contents, the "trial period" may be used by the user to see if the map data are not obsolete, if partly, and accurately reflect the rows of houses and stores of streets before they actually buy them. Such a use provides an advantage that the user is protected against buying unnecessary contents. Then, the seller selling such contents may be forced to provide the most updated information. However, it is a good way for making the seller reliable and able to supply high quality contents to the market.

The flash memory 17 of each of the above described storage medium 10, 40 and 70 may be replaced by some other storage means such as an HDD (HD drive) using an HD (hard disc), which is a magnetic disc, as a storage medium. In other words, the present invention is not limited by the type of storage means.

It should be understood by those skilled in the art that various modifications, combinations, sub-combinations and alterations may occur depending on design requirements and other factors insofar as they are within the scope of the appended claims or the equivalents thereof.

What is claimed is:

1. A data providing system having a terminal apparatus and a data storage apparatus connected to the terminal apparatus by way of a predetermined connection interface, the data storage apparatus comprising:
    a first storage area used to write data from the terminal apparatus connected to the data storage apparatus, and limit reading of the written data in a data format used by the terminal apparatus;
    a second storage area storing software for executing an operation of reading out the data written in the first storage area;
    a memory storing instructions; and
    a processor executing the instructions to:
        generate random numbers used in updating a table of random numbers each time a power supply to the data storage apparatus is activated;
        read out the data written in the first storage area in response to a request from the terminal apparatus to read out the data written in the first storage area
        encrypt the data using an encryption key annexed to the software, wherein the encryption key is generated from the table of random numbers and the data read out from the first storage area is encrypted using the generated encryption key; and
        transmit the encrypted and the software to the terminal apparatus;
    the terminal apparatus comprising:
    a processor executing instructions to:
        encrypt the software transmitted from the data storage apparatus;
        decrypt the encrypted data transmitted from the data storage apparatus using the encryption key annexed to the software; and
        convert the decrypted data into a signal of the data format of the terminal apparatus;
        wherein the encryption key is generated from the table of random numbers and the encrypted data is decrypted using the generated encryption key.

2. The system according to claim 1, wherein the data storage apparatus further comprises a timer for reading a current clock time, and the processor of the data storage apparatus executes instructions to:
    compare a difference between a current reading of the timer and a reading of the timer given by the timer when the data is written into the first storage area with a time limit of availability of the data given when the data is written into the first storage area, and
    erase the data if the difference exceeds the time limit of availability.

3. The system according to claim 1, wherein the first storage area and the second storage area of the data storage apparatus are part of a non-volatile semiconductor memory.

4. The system according to claim 1, wherein the first storage area and the second storage area of the data storage apparatus are part of a magnetic disc drive using a magnetic disc as storage medium.

5. A data storage apparatus to be connected to an external apparatus by way of a predetermined connection interface, the apparatus comprising:
- a first storage area used to freely write data from the external apparatus connected to the data storage apparatus and limit reading of the written data in a data format used by the external apparatus;
- a second storage area storing software for executing an operation of reading out the data written in the first storage area;
- a memory storing instructions; and
- a processor executing the instructions to:
  - generate, by a random number generator, random numbers used in updating a table of random numbers of the data storage apparatus each time the power supply to the data storage apparatus is activated;
  - read out the data written in the first storage area in response to a request from the external apparatus to read out the data written in the first storage area;
  - encrypt the data using an encryption key annexed to the software, wherein the encryption key is generated from the table of random numbers and the data read out from the first storage area is encrypted using the generated encryption key; and
  - transmit the encrypted data and the software annexed by the encryption key to the terminal apparatus.

6. The apparatus according to claim 5, further comprising a timer for reading a current clock time to compare a difference between the current reading of the timer and a reading of the timer given by the timer when the data is written into the first storage area with a time limit of availability of the data given when the data is written into the first storage area, and erase the data if the difference exceeds the time limit of availability.

7. The apparatus according to claim 5, wherein the first storage area and second storage area are part of a non-volatile semiconductor memory.

8. The apparatus according to claim 5, wherein the first storage area and second storage area are part of a magnetic disc drive using a magnetic disc as storage medium.

9. A data providing method of a data storage apparatus connected to an external apparatus by way of a predetermined connection interface, the method comprising the steps of:
- reading out data written in a first storage area of the data storage apparatus by executing software stored in a second storage area of the data storage apparatus in response to a request from the external apparatus connected to the data storage apparatus to read out data;
- providing the data by transmitting the data to the external apparatus connected to the data storage apparatus after converting the data into a signal of the output format of the external apparatus;
- determining, based on a timer reflecting the amount of time the data has been written in the first storage area, whether a time limit of availability of the provided data has been exceeded; and
- erasing the data from the first storage area when the timer exceeds the time limit of availability.

10. A data providing method of a data providing system comprising a terminal apparatus and a data storage apparatus connected to the terminal apparatus by way of a predetermined connection interface, the method comprising the steps of:
- extracting an encryption key for executing an operation of reading out data stored in a second storage area of the data storage apparatus;
- transmitting software to the terminal apparatus;
- transmitting a request to read out data written in a first storage area of the data storage apparatus by executing the transmitted software by the terminal apparatus;
- subsequently reading out the data written in the first storage area in response to the data reading out request and encrypting the read out data using the encryption key by the data storage apparatus;
- transmitting the encrypted data to the terminal apparatus;
- subsequently decrypting the encrypted and transmitted data using the encryption key annexed to the software by the terminal apparatus; and
- converting the decrypted data into a signal of the output format of the terminal apparatus and providing the data.

11. The method according to claim 10, wherein the data storage apparatus is adapted to compare a difference between a current reading of a timer and a reading of the timer given by the timer when the data is written into the first storage area with a time limit of availability of the data given when the data is written into the first storage area, and erase the data if the difference exceeds the time limit of availability.

12. The method according to claim 10, wherein the data storage apparatus generates the encryption key from a table of random numbers annexed to the software, and encrypts the data read out from the first storage area using the generated encryption key, and
the terminal apparatus generates the encryption key from the table of random numbers annexed to the software, and decrypts the encrypted and transmitted data using the generated encryption key.

13. The method according to claim 12, wherein the data storage apparatus updates the table of random numbers annexed to the software using random numbers generated each time a power supply to the data storage apparatus is activated.

* * * * *